United States Patent
Song et al.

(10) Patent No.: US 11,569,517 B2
(45) Date of Patent: Jan. 31, 2023

(54) FUEL CELL CONTROL METHOD AND SYSTEM BASED ON MODEL PREDICTIVE CONTROL

(71) Applicant: Tongji University, Shanghai (CN)

(72) Inventors: Ke Song, Shanghai (CN); Xiaodi Wang, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 17/396,337

(22) Filed: Aug. 6, 2021

(65) Prior Publication Data
US 2022/0045343 A1    Feb. 10, 2022

(30) Foreign Application Priority Data

Aug. 7, 2020    (CN) .......................... 202010789077.7

(51) Int. Cl.
| | | |
|---|---|---|
| *H01M 8/04* | (2016.01) | |
| *H01M 8/04992* | (2016.01) | |
| *H01M 8/0438* | (2016.01) | |
| *H01M 8/04537* | (2016.01) | |
| *H01M 8/04746* | (2016.01) | |

(52) U.S. Cl.
CPC ... *H01M 8/04992* (2013.01); *H01M 8/04395* (2013.01); *H01M 8/04552* (2013.01); *H01M 8/04753* (2013.01); *H01M 2250/20* (2013.01)

(58) Field of Classification Search
CPC ......... H01M 8/04992; H01M 8/04395; H01M 8/04552; H01M 8/04753
See application file for complete search history.

(56) References Cited

U.S. PATENT DOCUMENTS

2013/0052545 A1*   2/2013   Okuyoshi ......... H01M 8/04492
                                                               429/400

* cited by examiner

*Primary Examiner* — Olatunji A Godo
(74) *Attorney, Agent, or Firm* — Eversheds Sutherland (US) LLP

(57) ABSTRACT

A fuel cell control method and system based on model prediction control are provided. The method includes: (1) obtaining data required for control; (2) determining whether the data required for control are received completely; (3) estimating an internal state of a fuel cell based on outlet pressure of an air compressor and a voltage of the fuel cell to obtain a state estimation result; (4) calculating a target outlet flow of the air compressor and a target current of the fuel cell with a model prediction control algorithm based on the state estimation result; (5) calculating a control voltage of the air compressor, and a target outlet flow of the air compressor; and (6) tracking power of the fuel cell based on the target current of the fuel cell, and controlling air supply of the fuel cell based on the control voltage of the air compressor.

14 Claims, 3 Drawing Sheets

US 11,569,517 B2

FUEL CELL CONTROL METHOD AND SYSTEM BASED ON MODEL PREDICTIVE CONTROL

CROSS-REFERENCE TO RELATED APPLICATIONS

This application claims the benefit and priority of Chinese Patent Application No. 202010789077.7, filed Aug. 7, 2020, the disclosure of which is incorporated herein in its entirety, as part of the present application.

TECHNICAL FIELD

The present disclosure relates to the field of fuel cell control, and in particular, to a fuel cell control method and system based on model prediction control.

BACKGROUND ART

Proton exchange membrane fuel cells (PEMFCs) have advantages such as high energy density, high efficiency, low operating temperature, and zero emission, and are one of ideal power sources for clean energy vehicles. It is essential to meet conditions such as sufficient reactant gas supplies, and appropriate temperature and humidity, so as to ensure normal operation of fuel cells. To meet these conditions, a fuel cell stack needs to cooperate with auxiliary systems. The auxiliary systems for the fuel cell mainly include a hydrogen supply system, an air supply system, a water management system, a thermal management system, and a power control system. The air supply system is one of crucial auxiliary systems for the fuel cell. On the one hand, the hysteresis of air supply system is the main factor leading to the slow dynamic response of fuel cell. On the other hand, power consumed by an air compressor accounts for most of power consumed by the auxiliary systems, affecting efficiency of the system. In addition, constraints such as surge and blockage in the air compressor have an important impact on a safe operation of a fuel cell system.

The air supply system for the fuel cells is controlled by various control methods including: PID control, fuzzy control, sliding mode control, model prediction control, and the like. These control methods still have the following problems: (1) a control priority of the air supply system is to ensure sufficient air supply, and to ensure efficiency of the system, an oxygen excess ratio needs to be controlled within an appropriate range. In the foregoing control methods, the oxygen excess ratio is appropriately controlled, but dynamic responses and constraints of the air compressor are omitted. (2) In the foregoing control methods, current of the fuel cell is often equivalent to a load. However, in an energy management policy of a fuel cell hybrid vehicle, the fuel cell system needs to output specific power quickly and accurately. Therefore, the foregoing control methods are difficult to be directly applied to the control of fuel cell used in vehicles. (3) Many state parameters of the fuel cell system, especially internal parameters of the fuel cell such as partial pressure of oxygen and water content at a cathode, cannot be measured with current sensing technologies. Suitable observers need to be designed to estimate the state parameters for system control.

Fuel cell vehicles usually face rapid and wide changes in power requirements. As for the slow dynamic response of the fuel cell, an auxiliary power source (battery/super capacitor) is added to a power system of the fuel cell vehicle to form an electric-electric hybrid system. In the energy management strategy, required power of the entire vehicle is supplied by the fuel cell and the auxiliary power source based on specific rules, so as to achieve goals of reducing hydrogen consumption and prolonging service life of the fuel cell while meeting constraints of the power system. Power response of the fuel cell system has a decisive effect on vehicle dynamics performance and optimization of the energy management strategy. The energy management strategy is designed without considering parasitic power of the fuel cell system, and as a result, net output power of the fuel cell system needs to satisfy a power allocation requirement of the energy management strategy.

Major problems of the power response of the fuel cell system and control of the air supply system are as follows: (1) The air compressor is an executor of the air supply system, which consumes a large amount of parasitic power and affects the net output power of the system. There is a coupling between the power response and control of the air supply, which makes it difficult to obtain satisfactory results with simple algorithms such as PID control. (2) The power response of the fuel cell depends on the control of the air supply system and is limited by the surge in the air compressor, which is less referred to in literatures. (3) Algorithms applied to the power response and the control of the air supply are more complex, occupy more computing resources, and cannot be actually applied to the system control.

SUMMARY

The present disclosure is intended to overcome defects in the conventional art and provide a fuel cell control method and device based on model prediction control that are accurate, reliable, and applicable to a fuel cell control system.

The effects of the present disclosure can be achieved by the following technical solutions:

A fuel cell control method based on model prediction control is provided and includes the following steps:

S1: obtaining data required for control, where the data required for control include required power for a fuel cell system, a rotational speed of an air compressor, outlet pressure of the air compressor, temperature of a fuel cell, gas pressure of a cathode inlet of the fuel cell, gas pressure of a cathode outlet of the fuel cell, a voltage of the fuel cell, and a current of the fuel cell;

S2: determining whether the data required for control are received completely, and under a condition that the data required for control are received completely, proceeding to step S3, otherwise proceeding to step S1;

S3: estimating an internal state of the fuel cell based on the outlet pressure of the air compressor and the voltage of the fuel cell to obtain a state estimation result, where the internal state includes pressure and partial pressure of oxygen of the cathode of the fuel cell;

S4: calculating a target outlet flow of the air compressor and a target current of the fuel cell with a model prediction control algorithm based on the state estimation result;

S5: calculating a control voltage of the air compressor based on the rotational speed of the air compressor, the outlet pressure of the air compressor, and the target outlet flow of the air compressor; and S6: tracking the power of the fuel cell based on the target current of the fuel cell, and controlling air supply of the fuel cell based on the control voltage of the air compressor.

Further, the model prediction control algorithm performs calculation based on a pre-established prediction model, where the prediction model includes a three-order linear state space model of an air supply system for the fuel cell, an input/output model of the fuel cell system and a performance index of the fuel cell system; and an expression of the three-order linear state space model of the air supply system for the fuel cell is as follows:

$$\begin{bmatrix} \dot{P}_{sm} \\ \dot{P}_{ca} \\ \dot{P}_{O_2} \end{bmatrix} = A_{3\times 3} \begin{bmatrix} P_{sm} \\ P_{ca} \\ P_{O_2} \end{bmatrix} + B_{3\times 2} \begin{bmatrix} I_{st} \\ W_{cp} \end{bmatrix}$$

where $P_{sm}$ is the outlet pressure of the air compressor, $P_{ca}$ is pressure of a cathode flow channel of the fuel cell, $P_{O_2}$ is partial pressure of oxygen of the cathode flow channel, $\dot{P}_{sm}$ is a first-order differential of the outlet pressure of the air compressor, $\dot{P}_{ca}$ is a first-order differential of the pressure of the cathode flow channel of the fuel cell, $\dot{P}_{O_2}$ a first-order differential of the partial pressure of oxygen of the cathode flow channel, $I_{st}$ is the current of the fuel cell, $W_{cp}$ is an outlet flow of the air compressor, $A_{3\times 3}$ is a first coefficient matrix, and $B_{3\times 2}$ is a second coefficient matrix.

Further, the input/output model of the fuel cell system takes the current of the fuel cell and an assumed outlet flow of the air compressor as an input, and a voltage of the fuel cell stack as an output, and an expression of the input/output model of the fuel cell system is as follows:

$$u = \begin{bmatrix} I_{st} \\ W_{cp} \end{bmatrix}$$

$$V_{st} = nV_{cell} = n[\lambda_1 + \lambda_2 \ln(P_{O_2}) + (\lambda_3 \cdot T_{st} + \lambda_4) \cdot i]$$

where $i = I_{st}/A_{fc}$ is current density of the fuel cell, $A_{fc}$ is an effective activation area, $V_{cell}$ is a voltage of a single fuel cell, u is input in the input/output model of the fuel cell system, $I_{st}$ is the current of the fuel cell, $W_{cp}$ is the assumed outlet flow of the air compressor, $V_{st}$ is the voltage of the fuel cell stack, n is the number of fuel cells, $P_{O_2}$ is the partial pressure of oxygen of the cathode flow channel, $T_{st}$ is the temperature of the fuel cell, $\lambda_1$ is a first parameter to be fitted, $\lambda_2$ is a second parameter to be fitted, $\lambda_3$ is a third parameter to be fitted, and $\lambda_4$ is a fourth parameter to be fitted.

Further, a calculation expression of a performance index $z_P$ of the fuel cell system is as follows:

$$z_P = \begin{bmatrix} P_{Net} \\ \lambda_{O_2} \end{bmatrix} = \begin{bmatrix} V_{st}I_{st} - \dfrac{C_p T_{atm}}{\eta_{cp}}\left[\left(\dfrac{P_{sm}}{P_{atm}}\right)^{\frac{\gamma-1}{\gamma}} - 1\right]W_{cp} \\ k_{ca,in} \dfrac{x_{O_2}}{1+\omega_{atm}} \dfrac{4F}{nM_{O_2}I_{st}}(P_{sm} - P_{ca}) \end{bmatrix}$$

where $P_{Net}$ is net output power of the fuel cell system, $\lambda_{O_2}$ is an oxygen excess ratio of the fuel cell system, $V_{st}$ is the voltage of the fuel cell, $I_{st}$ is the current of the fuel cell, $C_p$ is a specific heat at constant pressure of the air, $T_{atm}$ is ambient temperature, $n_{cp}$ is efficiency of the air compressor, $P_{sm}$ is the outlet pressure of the air compressor, $P_{atm}$ is ambient pressure, $W_{cp}$ is the outlet flow of the air compressor, $\gamma$ is a heat ratio coefficient of the air, $k_{ca,in}$ is an inlet flow coefficient of the cathode flow channel, $x_{O_2}$ is a mass fraction of oxygen in the air, $\omega_{atm}$ is a mass fraction of water vapor in the air, F is the Faraday constant, n is the number of fuel cells, $M_{O_2}$ is a molar mass of oxygen, and $P_{ca}$ is the pressure of the cathode flow channel of the fuel cell.

Further, an optimal control law of the prediction model is solved by adopting a particle swarm algorithm, and the optimal control law is applied to the fuel cell system.

Further, in step S3, the internal state of the fuel cell is estimated by adopting an unscented Kalman filter.

Further, in step S5, a calculation expression of the control voltage of the air compressor is as follows:

$$v_{cm}(k) = \dfrac{R_{cm}}{\eta_{cm}k_t}(\tau_{cp} + J\bar{\alpha}_{cp}) + k_v \omega_{cp}^*(k)$$

where $v_{cm}(k)$ is a control voltage of the air compressor at time k, $R_{cm}$ is armature resistance of a drive motor of the air compressor, $\eta_{cm}$ is a mechanical efficiency of the drive motor of the air compressor, $k_t$ is a first motor constant, $k_v$ is a second motor constant, J is rotational inertia of the air compressor, $\tau_{cp}$ is a predicted load moment of the air compressor, $\bar{\alpha}_{cp}$ average angular acceleration of the air compressor, and $\omega^*_{cp}(k)$ is target angular speed of the air compressor.

Further, a calculation expression of the target angular speed $\omega^*_{cp}(k)$ of the air compressor is as follows:

$$\omega^*_{cp}(k+1) = \dfrac{2\pi n^*_{cp}(k+1)}{60}$$

where $n^*_{cp}(k+1)$ is a target rotational speed of the air compressor and is calculated based on the target outlet flow of the air compressor, the outlet pressure of the air compressor predicted by the prediction model, and a static map of the air compressor.

Further, a calculation expression of the predicted load moment $\tau_{cp}$ of the air compressor is as follows:

$$\tau_{cp} = \dfrac{C_p}{\omega^*_{cp}(k+1)}\dfrac{T_{atm}}{\eta_{cp}}\left[\left(\dfrac{\hat{P}_{sm}(k+1)}{P_{atm}}\right)^{\frac{\gamma-1}{\gamma}} - 1\right]W^*_{cp}(k)$$

where $C_p$ is the specific heat at the constant pressure of the air, $T_{atm}$ is the ambient temperature, $P_{atm}$ is the ambient pressure, $\eta_{cp}$ is the efficiency of the air compressor, $W^*_{cp}(k)$ is a target outlet flow of the air compressor at the time k, and $\hat{P}_{sm(k+1)}$ is outlet pressure of the air compressor at the time k+1 predicted by the prediction model; and a calculation expression of the average angular acceleration $\bar{\alpha}_{cp}$ of the air compressor is as follows:

$$\bar{\alpha}_{cp} = \dfrac{\hat{\omega}^*_{cp}(k+1) - \omega_{cp}(k)}{T}$$

where T is a control period, and $\omega_{cp}(k)$ is a current rotational speed of the air compressor.

The present disclosure also provides a fuel cell control system based on model prediction control, including a fuel cell control unit, a CAN bus, a data collection module, an air compressor controller, and a DC/DC controller, where the fuel cell control unit is separately connected to the data collection module, the air compressor controller, and the DC/DC controller through the CAN bus, and the fuel cell control unit executes the steps in the foregoing method.

Compared with the conventional art, the present disclosure has the following advantages:

(1) In the present disclosure, the track of the power of the fuel cell, efficiency of the fuel cell, and system constraints are comprehensively considered, and the power of the fuel cell system is tracked and the air supply system is controlled by using a model prediction control algorithm, to control the system to rapidly and accurately track the required power and improve the power of the system, while ensuring that the system works within a safe range.

(2) In the present disclosure, the three-order linear state space model of the air supply system for the fuel cell is used as the prediction model, and the control voltage of the air compressor is calculated based on an output of the prediction model, to greatly reduce the amount of calculation, which is easy to implement in actual vehicles.

(3) In the present disclosure, the oxygen excess ratio is included in the performance index of the fuel cell system, and during a prediction control process, the oxygen excess ratio of the fuel cell is adjusted to avoid oxygen starvation, so as to improve the efficiency of the system.

(4) In the present disclosure, an actual operation variable of the air supply system is the control voltage of the air compressor, and based on the prediction model, a novel algorithm for converting a target air flow of the air compressor into the control voltage of the air compressor is provided, significantly improving computing efficiency of a policy.

(5) In the present disclosure, the unscented Kalman filter is used for optimal estimation of unmeasurable state parameters of the air supply system, to solve the problems that there are interferences in an actual measured value of the air supply system and some states of the air supply system are unmeasurable.

In the figures, MPC represents model prediction control, and UKF represents unscented Kalman filter.

DETAILED DESCRIPTION OF THE EMBODIMENTS

The present disclosure is now described in detail in conjunction with the accompanying drawings and specific embodiments. The embodiments are implemented on the premise of the technical solutions of the present disclosure. The following presents the detailed implementations and specific operation processes. The protection scope of the present disclosure, however, is not limited to the following embodiments.

Embodiment 1

Figure 1:
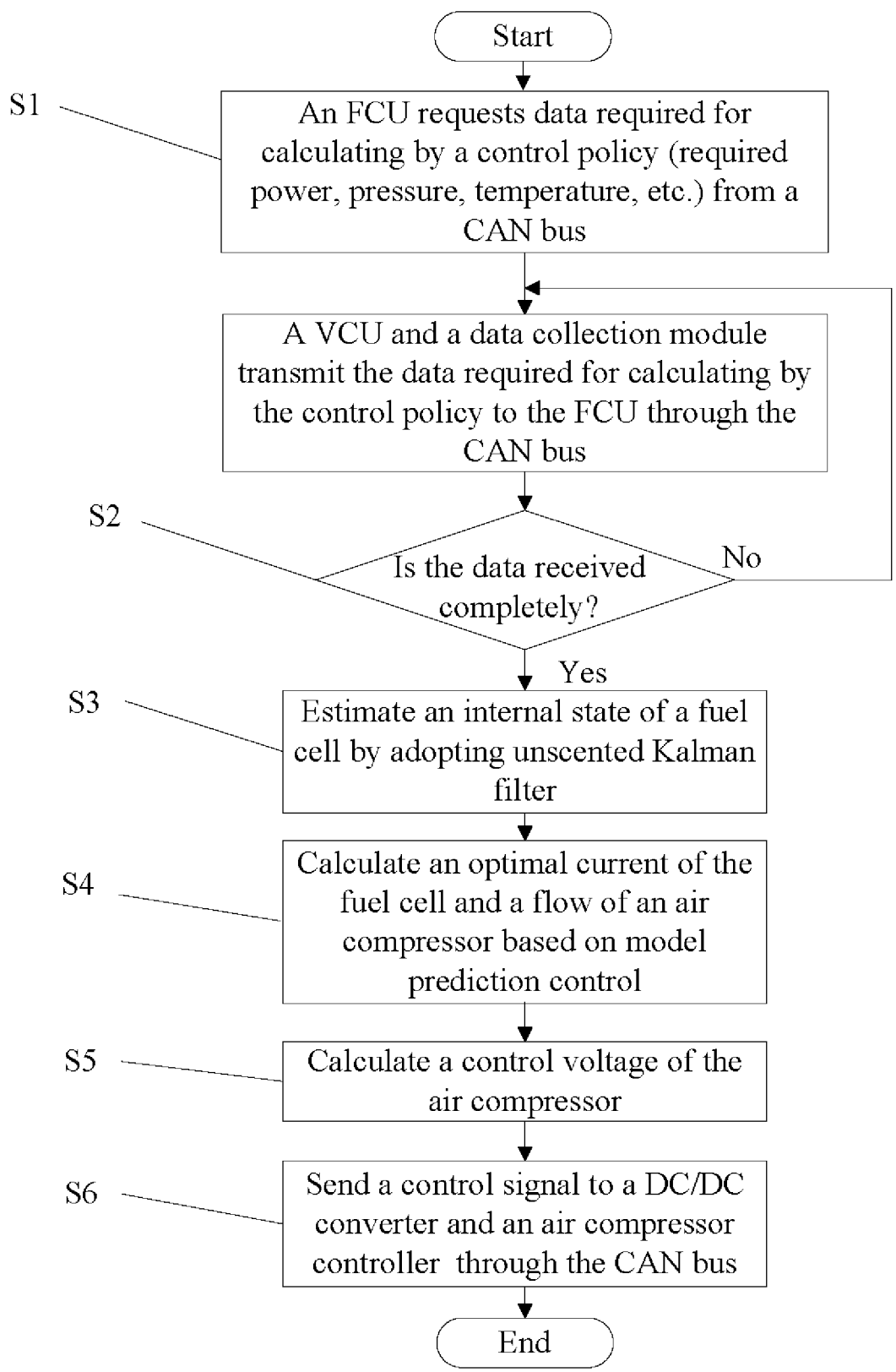
FIG. 1 is a schematic flowchart of a fuel cell control method based on model prediction control according to the present disclosure.
Figure 2:
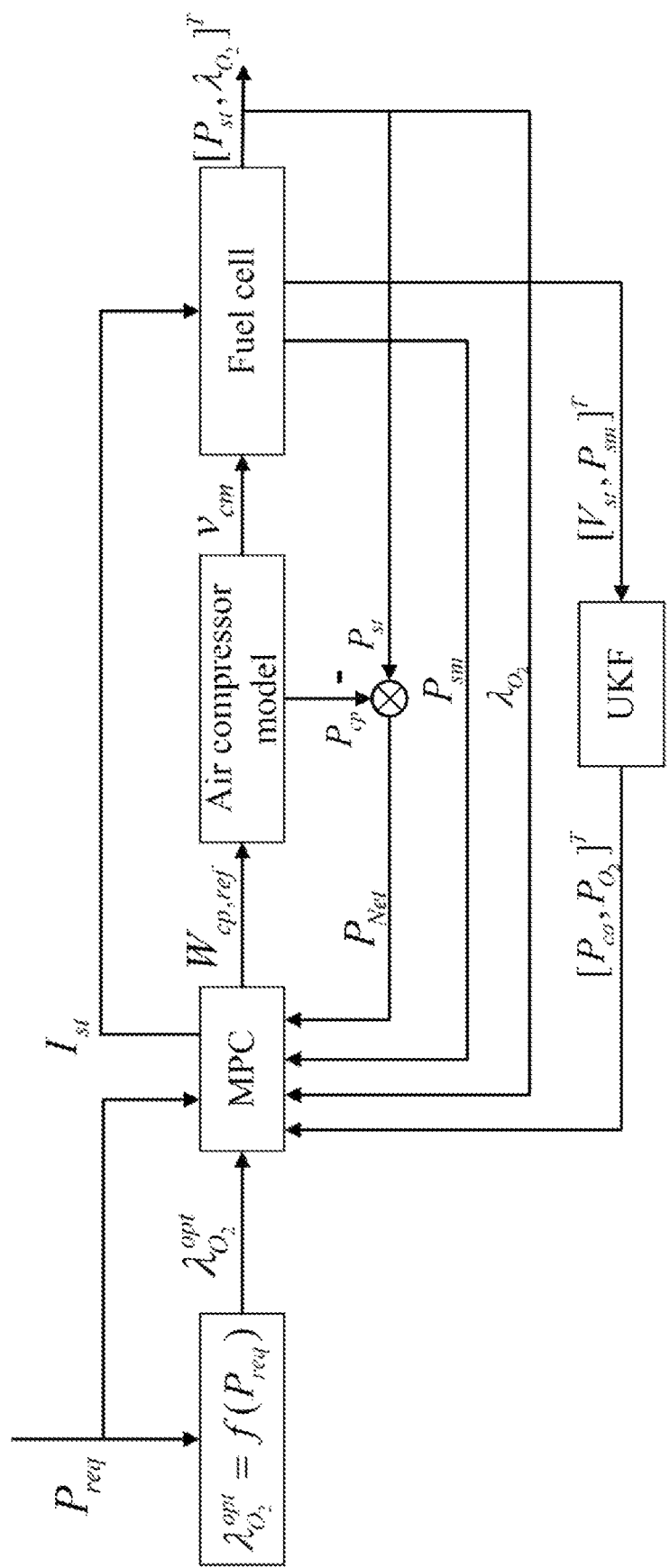
FIG. 2 is a schematic diagram of a data processing procedure of the fuel cell control method based on the model prediction control according to the present disclosure.

As shown in FIG. 1 and FIG. 2, a fuel cell control method based on model prediction control is provided in this embodiment, wherein, by adopting a segmented control, taking an outlet air flow of the air compressor as an intermediate variable, a current of the fuel cell and the outlet air flow of the air compressor as operation variables, and net output power and an oxygen excess ratio of the fuel cell system as performance indexes, a model prediction control algorithm of the air supply system of the fuel cell is designed, and a particle swarm algorithm is used to solve an optimal control. Considering that an actual operation variable of the air supply system is a voltage of the air compressor, a novel algorithm for converting a target air flow of the air compressor into the control voltage of the air compressor is provided based on a prediction model. With respect to problems that there are interferences in an actual measured value of the air supply system and some states of the air supply system are unmeasurable, an unscented Kalman filter is used for optimal estimation of the unmeasurable state of the air supply system. The fuel cell control method of this embodiment can realize rapidly and accurately tracking of net output power of the fuel cell system to required power for the VCU, meanwhile, adjust the oxygen excess ratio of the fuel cell to avoid oxygen starvation, so as to improve system efficiency.

In this embodiment, the fuel cell control method based on the model prediction control is applied to a fuel cell control system.

Figure 3:
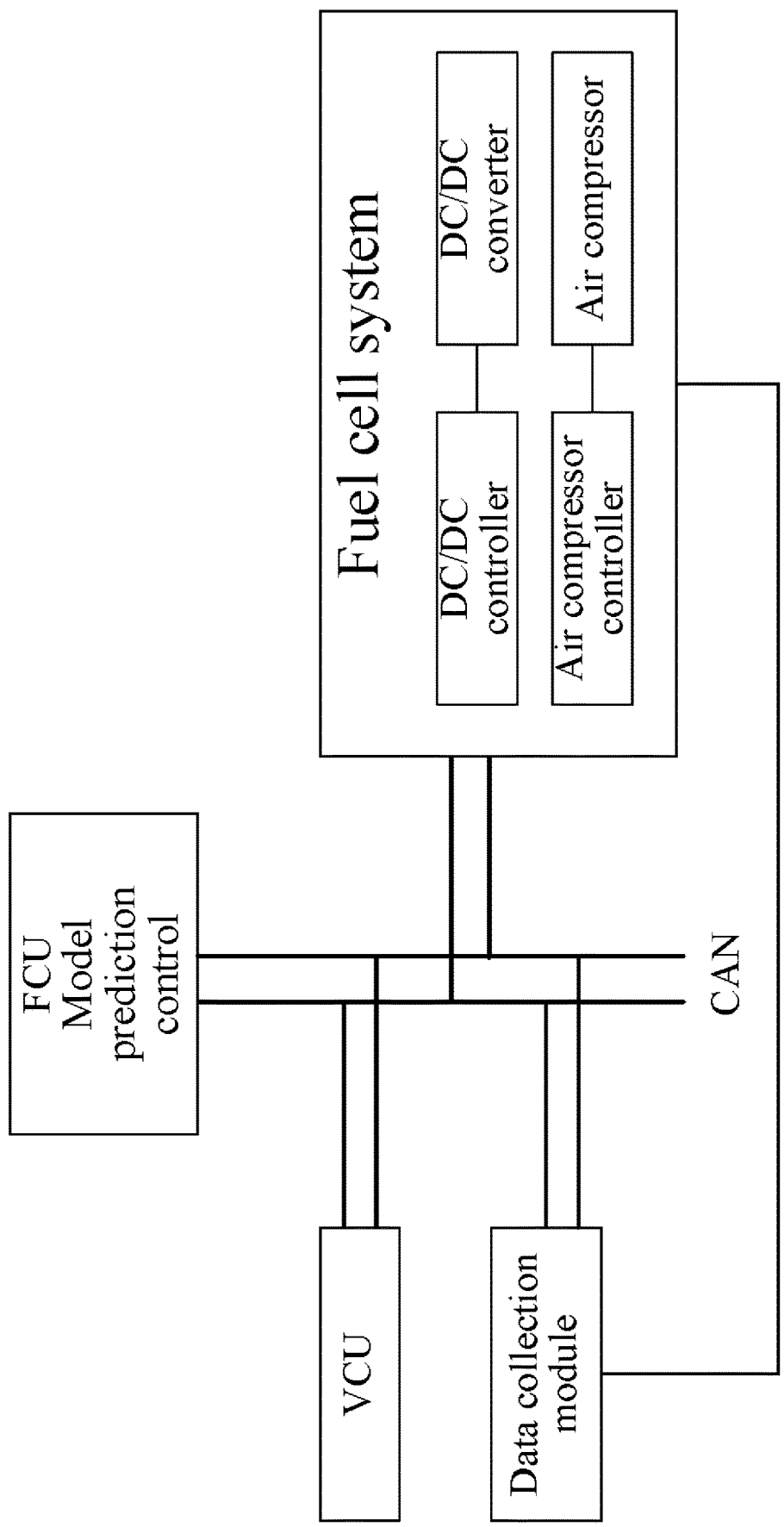
FIG. 3 is a schematic structure diagram of the fuel cell control system based on the model prediction control according to the present disclosure.

As shown in FIG. 3, the fuel cell control system based on the model prediction control includes a vehicle control unit (VCU), a fuel cell control unit (FCU), a CAN bus, a data collection module, an air compressor, an air compressor controller, a DC/DC converter, and a DC/DC controller, where the fuel cell control unit is separately connected to the data collection module, the air compressor controller, and the DC/DC controller through the CAN bus, the air compressor is connected to the air compressor controller, the DC/DC converter is connected to the DC/DC controller, and the fuel cell control unit executes the steps in the fuel cell control method based on the model prediction control.

Specifically, the fuel cell control method includes following steps:

S1: The fuel cell control unit (FCU) sends an access signal to the vehicle control unit (VCU) and the data collection module through the CAN bus, to obtain data required for control, where the data required for control include required power for the fuel cell system, a rotational speed of the air compressor, outlet pressure of the air compressor, temperature of the fuel cell, gas pressure of a cathode inlet of the fuel cell, gas pressure of a cathode outlet of the fuel cell, a voltage of the fuel cell, and a current of the fuel cell.

S2: The fuel cell control unit determines whether the data required for control are received completely; and under a condition that the data required for control are received completely, proceed to step S3, otherwise proceed to step S1.

S3: The fuel cell control unit estimates an internal state of the fuel cell based on the outlet pressure of the air compressor and the voltage of the fuel cell to obtain a state estimation result, where the internal state includes pressure and partial pressure of oxygen of the cathode of the fuel cell.

S4: The fuel cell control unit calculates a target outlet flow of the air compressor and a target current of the fuel cell with a model prediction control algorithm based on the state estimation result.

S5: The fuel cell control unit calculates a control voltage of the air compressor based on the rotational speed of the air compressor, the outlet pressure of the air compressor, and the target outlet flow of the air compressor.

S6: The fuel cell control unit tracks the power of the fuel cell based on the target current of the fuel cell, and controls air supply of the fuel cell based on the control voltage of the air compressor.

Each step is described in detail below.

1. Step S3

Step S3 specifically includes: the fuel cell control unit estimates the internal state of the fuel cell by using the unscented Kalman filter based on the data required for control, including the outlet pressure $P_{sm}$ of the air compressor and the voltage $V_{st}$ of the fuel cell, where the internal state includes the pressure and partial pressure of oxygen of the cathode of the fuel cell $x=[P_{ca}, P_{O_2}]^T$.

Specific steps of the unscented Kalman filter are as follows:

A state variable x is an n-dimensional random variable, an average $\bar{x}$ and covariance P of the state variable x are known, and u(k) is an input of the system.

S301: Multiple Sigma points, namely sampling points, are calculated by using the following equations:

$$x^{(0)} = \bar{x}$$

$$x^{(i)} = \bar{x} + (\sqrt{(n+\lambda)P})^T_i, i=1,\ldots,n$$

$$x^{(n+i)} = \bar{x} - (\sqrt{(n+\lambda)P})^T_i, i=1,\ldots,n$$

where $x^{(i)}$ is 2n+1 sigma points obtained through distributed sampling, $(\sqrt{(n+\lambda)P})$ is a square root of a matrix of $(n+\lambda)P$, $(\sqrt{(n+\lambda)P})^T(\sqrt{(n+\lambda)P})=n+\lambda)P$, and $(\sqrt{(n+\lambda)P})_i$ represents the $i^{th}$ row of $(\sqrt{(n+\lambda)P})$.

Weight coefficient w corresponding to each Sigma point is selected based on the following equations:

$$\begin{cases} w_m^0 = \frac{\lambda}{n+\lambda} \\ w_c^0 = \frac{\lambda}{n+\lambda} + (1-\alpha^2+\beta) \\ w_i^m = w_i^c = \frac{1}{2(n+\lambda)}, i=1,\ldots,2n \end{cases}$$

where m represents an average, c represents covariance; parameter $\lambda = \alpha^2(n+\kappa) - n$; a selection of $\alpha$ controls a distribution state of the sampling points; $\kappa$ is a parameter to be determined, and usually is 0, and $\beta$ is a state distribution parameter, and is optimal for the Gaussian distribution $\beta=2$.

S302: At time k, a set of Sigma points are obtained by using the foregoing equation:

$$x_i(k|k) = [\hat{x}(k|k), \hat{x}(k|k) + \sqrt{(n+\lambda)P(k|k)}, \hat{x}(k|k) - \sqrt{(n+\lambda)P(k|k)}]$$

where $x_i(k|k)$ is a Sigma point obtained at the time k, $\hat{x}(k|k)$ is an average of state variables at the time k, and $P(k|k)$ is a variance of the state variables at the time k.

S303: The sampling points are updated based on a state equation of the system by using the following equation:

$$x_i(k+1|k) = f(k, x_i(k|k), u(k)) + W(k)$$

where u(k) is an input of the system at the time k, the input of the system includes the current of the fuel cell and the outlet flow of the air compressor $u=[I_{st}, W_{cp}]^T$, $f(k, x_i(k|k), u(k))$ is a state equation of the system at the time k, and W(k) is white noise in a process.

Linear continuous state equations of the system are as follows:

$$\begin{cases} \frac{dP_{sm}}{dt} = -\frac{k_3 k_{ca,in} RT_{atm}}{M_{a,atm} V_{sm}} P_{sm} + \frac{k_3 k_{ca,in} RT_{atm}}{M_{a,atm} V_{sm}} P_{ca} + \frac{k_3 RT_{atm}}{M_{a,atm} V_{sm}} W_{cp} \\ \frac{dP_{ca}}{dt} = \frac{k_{ca,in} RT_{st}}{V_{ca}} \left[ \frac{1}{M_{O_2}} \left( \frac{x_{O_2}}{1+\omega_{atm}} \right) + \frac{1}{M_{N_2}} \left( \frac{1-x_{O_2}}{1+\omega_{atm}} \right) \right] P_{sm} - \\ \frac{RT_{st}}{V_{ca}} \left\{ k_{ca,in} \left[ \frac{1}{M_{O_2}} \left( \frac{x_{O_2}}{1+\omega_{atm}} \right) + \frac{1}{M_{N_2}} \left( \frac{1-x_{O_2}}{1+\omega_{atm}} \right) \right] + \frac{k_2}{k_1} \right\} P_{ca} - \\ \frac{nRT_{st}}{4V_{ca}F} I_{st} + \frac{k_2 RT_{st}}{k_1 V_{ca}} P_{sat} \\ \frac{dP_{O_2}}{dt} = \frac{k_{ca,in} RT_{st}}{M_{O_2} V_{ca}} \left( \frac{x_{O_2}}{1+\omega_{atm}} \right) P_{sm} - \frac{k_{ca,in} RT_{st}}{M_{O_2} V_{ca}} \left( \frac{x_{O_2}}{1+\omega_{atm}} \right) P_{ca} - \\ \frac{k_2 RT_{st}}{k_1 V_{ca}} P_{O_2} - \frac{nRT_{st}}{4V_{ca}F} I_{st} \end{cases}$$

where $k_{ca,in}$ is an inlet flow coefficient of a cathode flow channel, R is a gas constant, $T_{atm}$ is ambient temperature, $P_{sm}$ is outlet pressure of the air compressor, $M_{a,atm}$ is a molar mass of air, $V_{sm}$ is a volume of an air supply pipe, $P_{ca}$ is pressure of the cathode flow channel of the fuel cell, $W_{cp}$ is an assumed outlet flow of the air compressor, $T_{st}$ is the temperature of the fuel cell, $V_{ca}$ is a volume of the cathode flow channel of the fuel cell, $M_{O_2}$ is a molar mass of oxygen, $x_{O_2}$ is a mass fraction of oxygen in the air, $\omega_{atm}$ is a mass fraction of water vapor in the air, $M_{N_2}$ a molar mass of nitrogen, F is a Faraday constant, $P_{sat}$ is saturated vapor pressure, $P_{O_2}$ is partial pressure of oxygen of the cathode flow channel, and $I_{st}$ is the current of the fuel cell. Herein, $k_1$, $k_2$, and $k_3$ are constants.

S304: One-step estimation of the system state at time k+1 is as follow:

$$\hat{x}(k+1|k) = \sum_{i=0}^{2n} w_i x_i(k+1|k)$$

A covariance matrix of the system at the time k+1 is as follow:

$$P(k+1|k) = \sum_{i=0}^{2n} w_i [\hat{x}(k+1|k) - x_i(k+1|k)][\hat{x}(k+1|k) - x_i(k+1|k)]^T + Q$$

where Q is a variance matrix of the white noise W(k) in the process.

S305: A one-step estimated value of an observed value is calculated based on an output equation of the system:

$$y_i(k+1|k) = g(x_i(k+1|k), u(k)) + V(k)$$

where $y_i(k+1|k)$ is the observed value of the system at the time k, $g(x_i(k+1|k)u(k))$ is an observation equation of the system at the time k, and V(k) is observed white noise.

Measurable output of the system is the voltage of the fuel cell and intake manifold pressure $y=[V_{st}, P_{sm}]^T$, where $$\begin{cases} V_{st} = nV_{cell} = n[\lambda_1 + \lambda_2 \ln(P_{O_2}) + (\lambda_3 \cdot T_{st} + \lambda_4) \cdot i] \\ \frac{dP_{sm}}{dt} = -\frac{k_3 k_{ca,in} RT_{atm}}{M_{a,atm} V_{sm}} P_{sm} + \frac{k_3 k_{ca,in} RT_{atm}}{M_{a,atm} V_{sm}} P_{ca} + \frac{k_3 RT_{atm}}{M_{a,atm} V_{sm}} W_{cp} \end{cases}$$

where $i=I_{st}/A_{fc}$ is current density of the fuel cell, $A_{fc}$ is an effective activation area, $V_{cell}$ is a voltage of a monolithic fuel cell, n is the number of stacks, $\lambda_1$, $\lambda_2$, $\lambda_3$, $\lambda_4$ parameters to be fitted, and $T_{st}$ is the temperature of the fuel cell.

S306: An average and covariance of the observed values of the system are calculated by using the following equations:

$$\bar{y}(k+1|k) = \sum_{i=0}^{2n} w_i y_i(k+1|k),$$

$$P_{y_k y_k} = \sum_{i=0}^{2n} w_i [y_i(k+1|k) - \bar{y}(k+1|k)][y_i(k+1|k) - \bar{y}(k+1|k)]^T + R,$$

and $$P_{x_k y_k} = \sum_{i=0}^{2n} w_i [\hat{x}_i(k+1|k) - \bar{x}(k+1|k)][y_i(k+1|k) - \bar{y}(k+1|k)]^T,$$

where R is a variance matrix of the observed white noise V(k), $P_{y_k y_k}$ is a variance matrix of the observed values, and $P_{x_k y_k}$ is a covariance matrix of observed variables and state variables.

S307: A Kalman gain matrix is calculated by using the following equation:

$$K(k+1) = P_{x_k y_k} P_{y_k y_k}^{-1}.$$

S308: Optimal state estimation $\hat{x}(k+1)$ and covariance matrix $P(k+1)$ of the system are calculated at the time k+1 by using the following equations:

$$\hat{x}(k+1) = \hat{x}(k+1|k) + K(k+1)[y(k+1) - \hat{y}(k+1|k)],$$

and $$P(k+1) = P(k+1|k) - K(k+1) P_{y_k y_k} K^T(k+1).$$

S309: State estimation at the time k is completed, and steps S301 to S308 are repeated at the time k+1.

2. Step S4

The fuel cell control unit calculates the target outlet flow of the air compressor and the current of the fuel cell with the model prediction control algorithm based on the received data and estimated data.

The model prediction control algorithm performs calculation based on a pre-established prediction model, where the prediction model includes a three-order linear state-space model of the air supply system for the fuel cell, an input/output model of the fuel cell system and a performance index of the fuel cell system.

The method specifically includes following steps:

S401: Off-line calculation: An optimal oxygen excess ratio corresponding to the net output power of the fuel cell system is determined. The optimal oxygen excess ratio is an oxygen excess ratio corresponding to the minimum operating current when the net output power of the fuel cell system is constant.

S402: The three-order linear state space model of the air supply system of the fuel cell is obtained based on a lumped parameter model of the air supply system of the fuel cell and reasonable assumptions without considering the air compressor:

$$\begin{bmatrix} \dot{P}_{sm} \\ \dot{P}_{ca} \\ \dot{P}_{O_2} \end{bmatrix} = A_{3\times 3} \begin{bmatrix} P_{sm} \\ P_{ca} \\ P_{O_2} \end{bmatrix} + B_{3\times 2} \begin{bmatrix} I_{st} \\ W_{cp} \end{bmatrix}$$

where $P_{sm}$ is the outlet pressure of the air compressor, $P_{ca}$ is the pressure of the cathode flow channel of the fuel cell, $P_{O_2}$ is the partial pressure of oxygen of the cathode flow channel, $\dot{P}_{sm}$ is a first-order differential of the outlet pressure of the air compressor, $\dot{P}_{ca}$ is a first-order differential of the pressure of the cathode flow channel of the fuel cell, $\dot{P}_{O_2}$ is a first-order differential of the partial pressure of oxygen of the cathode flow channel, $I_{st}$ is the current of the fuel cell, $W_{cp}$ is the outlet flow of the air compressor, $A_{3\times 3}$ is a first coefficient matrix, and $B_{3\times 2}$ is a second coefficient matrix.

The foregoing model is used as a prediction model to predict a future state and output of the fuel cell system based on the current state of the fuel cell system and the assumed input. The state of the fuel cell system includes the outlet pressure of the air compressor of the fuel cell, and the pressure and the partial pressure of oxygen of the cathode flow channel of the fuel cell.

The input of the system is the current of the fuel cell and the flow of the air compressor:

$$u = \begin{bmatrix} I_{st} \\ W_{cp} \end{bmatrix}$$

The output of the fuel cell system is a voltage $V_{st}$ of the fuel cell stack:

$$V_{st} = nV_{cell} = n[\lambda_1 + \lambda_2 ln(P_{O_2}) + (\lambda_3 \cdot T_{st} + \lambda_4) \cdot i]$$

where $i = I_{st}/A_{fc}$ is the current density of the fuel cell, $A_{fc}$ is the effective activation area, $V_{cell}$ is the voltage of the single fuel cell, u is input in the input/output model of the fuel cell system, $I_{st}$ is the current of the fuel cell, $W_{cp}$ the assumed outlet flow of the air compressor, $V_{st}$ is the voltage of the fuel cell stack, n is the number of fuel cells, $P_{O_2}$ is the partial pressure of oxygen of the cathode flow channel, $T_{st}$ is the temperature of the fuel cell, $\lambda_1$ is a first parameter to be fitted, $\lambda_2$ is a second parameter to be fitted, $\lambda_3$ is a third parameter to be fitted, and $\lambda_4$ is a fourth parameter to be fitted.

The performance indexes of the fuel cell system are the net output power and the oxygen excess ratio of the fuel cell system:

$$z_P = \begin{bmatrix} P_{Net} \\ \lambda_{O_2} \end{bmatrix} = \begin{bmatrix} V_{st}I_{st} - \dfrac{C_p T_{atm}}{\eta_{cp}}\left[\left(\dfrac{P_{sm}}{P_{atm}}\right)^{\frac{\gamma-1}{\gamma}} - 1\right]W_{cp} \\ k_{ca,in} \dfrac{x_{O_2}}{1+\omega_{atm}} \dfrac{4F}{nM_{O_2}I_{st}}(P_{sm} - P_{ca}) \end{bmatrix}$$

where $P_{Net}$ is the net output power of the fuel cell system, $\lambda_{O_2}$ is the oxygen excess ratio of the fuel cell system, $V_{st}$ is the voltage of the fuel cell, $I_{st}$ is the current of the fuel cell, $C_p$ is a specific heat at constant pressure of air, $T_{atm}$ is the ambient temperature, $\eta_{cp}$ is efficiency of the air compressor, $P_{sm}$ is the outlet pressure of the air compressor, $P_{atm}$ is ambient pressure, $W_{cp}$ is the outlet flow of the air compressor, $\gamma$ is a heat ratio coefficient of the air, $k_{ca,in}$ in is an inlet flow coefficient of the cathode flow channel, $x_{O_2}$ is the mass fraction of oxygen in the air, $\omega_{atm}$ is the mass fraction of water vapor in the air, F is the Faraday constant, n is the number of fuel cells, $M_{O_2}$ is the molar mass of oxygen, and $P_{ca}$ is the pressure of the cathode flow channel of the fuel cell.

S403: Rolling optimization: An optimal control law is solved by using the particle swarm algorithm. The optimal control law refers to optimization of a performance function of the fuel cell system in $N_p$ time domain under actions of $N_c$ control signals in the future. The optimized performance function is as follows:

$$\min J = \sum_{i=1}^{N_p}(\hat{z}_p(k+i) - z_r(k+i))^T Q_z(\hat{z}_p(k+i) - z_r(k+i)) + \sum_{i=0}^{N_c-1}(\Delta u(k+i))^T R_z(\Delta u(k+i))$$

where $N_p$ is a prediction step, $N_c$ is a control step, and $N_p \geq N_c$. $z_r$ is a reference trajectory, and $Q_z$, $R_z$ are weighting matrixes with a corresponding dimension.

After the optimal control law is calculated, the first element of the control law is applied to the system.

S404: Feedback correction: A difference between the output predicted by the prediction model and actual output of the fuel cell system is used as an error correction prediction model in a next control cycle.

3. Step S5

The fuel cell control unit calculates the control voltage of the air compressor based on the current rotational speed, the outlet pressure, and the target outlet flow of the air compressor of the fuel cell system.

A specific calculation process is as follows:

S501: The target rotational speed $n^*_{cp}(k+1)$ and a target angular speed $\omega^*_{cp}(k+1)$ of the air compressor are calculated based on the target outlet flow of the air compressor, the outlet pressure of the air compressor predicted by the prediction model, and a static map of the air compressor, where $$\omega^*_{cp}(k+1) = \frac{2\pi n^*_{cp}(k+1)}{60}.$$

S502: A predicted load moment of the air compressor is calculated by:

$$\tau_{cp} = \frac{C_p}{\omega^*_{cp}(k+1)} \frac{T_{atm}}{\eta_{cp}}\left[\left(\frac{\hat{P}_{sm}(k+1)}{P_{atm}}\right)^{\frac{\gamma-1}{\gamma}} - 1\right] W^*_{cp}(k)$$

where $C_p$ is the specific heat at the constant pressure of the air, $T_{atm}$ is the ambient temperature, $P_{atm}$ is the ambient pressure, $\eta_{cp}$ is the efficiency of the air compressor, $W^*_{cp}(k)$ is the target outlet flow of the air compressor, and $\tau_{cp}$ is the load moment of the air compressor.

S503: An average angular acceleration of the air compressor is calculated by:

$$\bar{\alpha}_{cp} = \frac{\omega^*_{cp}(k+1) - \omega_{cp}(k)}{T}$$

where T is a control period, and $\omega_{cp}(k)$ is a current rotational speed of the air compressor.

S504: The control voltage of the air compressor is calculated by:

$$v_{cm}(k) = \frac{R_{cm}}{\eta_{cm}k_t}(\tau_{cp} + J\bar{\alpha}_{cp}) + k_v\omega^*_{cp}(k)$$

where $R_{cm}$ is armature resistance of a drive motor of the air compressor, $\eta_{cm}$ is a mechanical efficiency of the drive motor, $k_t$ and $k_v$ are motor constants, and J is rotational inertia of the air compressor.

4. Step S6

The fuel cell control unit sends the current of the fuel cell and the control voltage of the air compressor to the DC/DC controller and an air compressor controller through the CAN bus to complete the track of the power of the fuel cell system and control of air supply.

5. Fuel Cell Control System

The fuel cell system includes the vehicle control unit, the fuel cell control unit, the CAN bus, the data collection module, the air compressor, the air compressor controller, the DC/DC converter, and the DC/DC controller. The DC/DC converter is connected to the DC/DC controller, the air compressor is connected to the air compressor controller, the data collection module is connected to the fuel cell system, and the fuel cell control unit is connected to the vehicle control unit, the data collection module, the DC/DC controller, and the air compressor controller. Data interaction among components is completed through the CAN bus. The FCU obtains the required power of the system and the data required for calculating by a control policy from the CAN bus, calculates the current of the fuel cell and the target flow of the air compressor through the model prediction control algorithm, calculates the control voltage of the air compressor based on the target flow, and sends the current of the fuel cell and the voltage of the air compressor to the DC/DC controller and the air compressor controller respectively through the CAN bus, to complete the control of the fuel cell system.

The preferred specific embodiments of the present disclose are described in detail above. It should be understood that, a person of ordinary skill in the art can make various modifications and variations according to the concept of the present disclosure without creative efforts. Therefore, all technical solutions that those skilled in the art can arrive at based on the conventional art through logical analysis, reasoning, or finite experiments according to the concept of the present disclosure shall fall within the protection scope defined by the appended claims.

What is claimed is:
1. A fuel cell control method based on model prediction control, comprising the following steps:
S1: obtaining data required for control, by a fuel cell control unit, from a vehicle control unit and a data collection module, wherein the data required for control comprise required power for a fuel cell system, a rotational speed of an air compressor, outlet pressure of the air compressor, temperature of a fuel cell, gas pressure of a cathode inlet of the fuel cell, gas pressure of a cathode outlet of the fuel cell, a voltage of the fuel cell, and a current of the fuel cell;

S2: determining whether all the data required for control are obtained by the fuel cell control unit, and under a condition that all the data required for control are obtained, proceeding to step S3, otherwise proceeding to step S1;

S3: by the fuel cell control unit, estimating an internal state of the fuel cell based on the outlet pressure of the air compressor and the voltage of the fuel cell by adopting an unscented Kalman filter algorithm, to obtain a state estimation result, wherein the internal state comprises pressure and partial pressure of oxygen of the cathode of the fuel cell;

wherein in the unscented Kalman filter algorithm, the current of the fuel cell and an outlet flow of the air compressor are taken as an input of a system, the voltage of the fuel cell and intake manifold pressure are taken as an output of the system;

wherein linear continuous state equations of the system are $$\begin{cases} \frac{dP_{sm}}{dt} = -\frac{k_3 k_{ca,in} RT_{atm}}{M_{a,atm} V_{sm}} P_{sm} + \frac{k_3 k_{ca,in} RT_{atm}}{M_{a,atm} V_{sm}} P_{ca} + \frac{k_3 RT_{atm}}{M_{a,atm} V_{sm}} W_{cp} \\ \frac{dP_{ca}}{dt} = \frac{k_{ca,in} RT_{st}}{V_{ca}} \left[ \frac{1}{M_{O_2}} \left( \frac{x_{O_2}}{1+\omega_{atm}} \right) + \frac{1}{M_{N_2}} \left( \frac{1-x_{O_2}}{1+\omega_{atm}} \right) \right] P_{sm} \\ \quad - \frac{RT_{st}}{V_{ca}} \left\{ k_{ca,in} \left[ \frac{1}{M_{O_2}} \left( \frac{x_{O_2}}{1+\omega_{atm}} \right) + \frac{1}{M_{N_2}} \left( \frac{1-x_{O_2}}{1+\omega_{atm}} \right) \right] + \frac{k_2}{k_1} \right\} P_{ca} \\ \quad - \frac{nRT_{st}}{4V_{ca}F} I_{st} + \frac{k_2 RT_{st}}{k_1 V_{ca}} P_{sat} \\ \frac{dP_{O_2}}{dt} = \frac{k_{ca,in} RT_{st}}{M_{O_2} V_{ca}} \left( \frac{x_{O_2}}{1+\omega_{atm}} \right) P_{sm} - \frac{k_{ca,in} RT_{st}}{M_{O_2} V_{ca}} \left( \frac{x_{O_2}}{1+\omega_{atm}} \right) \\ \quad P_{ca} - \frac{k_2 RT_{st}}{k_1 V_{ca}} P_{O_2} - \frac{nRT_{st}}{4V_{ca}F} I_{st} \end{cases}$$

wherein $k_{ca,in}$ is an inlet flow coefficient of a cathode flow channel, R is a gas constant, $T_{atm}$ is ambient temperature, $P_{sm}$ is outlet pressure of the air compressor, $M_{a,atm}$ is a molar mass of air, $V_{sm}$ is a volume of an air supply pipe, $P_{ca}$ is pressure of the cathode flow channel of the fuel cell, $W_{cp}$ is an assumed outlet flow of the air compressor, $T_{st}$ is the temperature of the fuel cell, $V_{ca}$ is a volume of the cathode flow channel of the fuel cell, $M_{O_2}$ is a molar mass of oxygen, $x_{O_2}$ is a mass fraction of oxygen in the air, $\omega_{atm}$ is a mass of water vapor in the air, $M_{N_2}$ is a molar mass of nitrogen, F is a Faraday constant, $P_{sat}$ saturated vapor pressure, $P_{O_2}$ is partial pressure of oxygen of the cathode flow channel, $I_{st}$ is the current of the fuel cell, and $k_1$, $k_2$, and $k_3$ are constants;

S4: by the fuel cell control unit, calculating a target outlet flow of the air compressor and a target current of the fuel cell with a model prediction control algorithm based on the state estimation result;

wherein the model prediction control algorithm performs calculation based on a pre-established prediction model, wherein the prediction model comprises a three-order linear state space model of an air supply system for the fuel cell;

wherein an expression of the three-order linear state space model of the air supply system for the fuel cell is as follows:

$$\begin{bmatrix} \dot{P}_{sm} \\ \dot{P}_{ca} \\ \dot{P}_{O_2} \end{bmatrix} = A_{3\times 3} \begin{bmatrix} P_{sm} \\ P_{ca} \\ P_{O_2} \end{bmatrix} + B_{3\times 2} \begin{bmatrix} I_{st} \\ W_{cp} \end{bmatrix}$$

wherein $P_{sm}$ is the outlet pressure of the air compressor, $P_{ca}$ is pressure of a cathode flow channel of the fuel cell, $P_{O_2}$ is partial pressure of oxygen of the cathode flow channel, $\dot{P}_{sm}$ is a first-order differential of the outlet pressure of the air compressor, $\dot{P}_{ca}$ is a first-order differential of the pressure of the cathode flow channel of the fuel cell, $\dot{P}_{O_2}$ is a first-order differential of the partial pressure of oxygen of the cathode flow channel, $I_{st}$ is the current of the fuel cell, $W_{cp}$ is an outlet flow of the air compressor, $A_{3\times 3}$ is a first coefficient matrix, and $B_{3\times 2}$ is a second coefficient matrix;

S5: by the fuel cell control unit, calculating a control voltage of the air compressor based on the rotational speed of the air compressor, the outlet pressure of the air compressor, and the target outlet flow of the air compressor;

wherein a calculation expression of the control voltage of the air compressor is:

$$v_{cm}(k) = \frac{R_{cm}}{\eta_{cm} k_t}(\tau_{cp} + J\bar{\alpha}_{cp}) + k_v \omega_{cp}^*(k)$$

wherein $V_{cm}(k)$ is a control voltage of the air compressor at time k, $R_{cm}$ is armature resistance of a drive motor of the air compressor, $\eta_{cm}$ is a mechanical efficiency of the drive motor of the air compressor, $k_t$ is a first motor constant, $k_v$ is a second motor constant, J is rotational inertia of the is air compressor, $\tau_{cp}$ a predicted load moment of the air compressor, $\bar{\alpha}_{cp}$ is average angular acceleration of the air compressor, and $\omega_{cp}^*(k)$ is target angular speed of the air compressor; and S6: by the fuel cell control unit, controlling the fuel cell to output on the target current of the fuel cell, and controlling air supply of the fuel cell based on the control voltage of the air compressor.

2. The fuel cell control method based on the model prediction control according to claim 1, wherein the prediction model further comprises an input/output model of the fuel cell system and a performance index of the fuel cell system.

3. The fuel cell control method based on the model prediction control according to claim 2, wherein the input/output model of the fuel cell system takes the current of the fuel cell and an assumed outlet flow of the air compressor as an input, and a voltage of the fuel cell stack as an output, and an expression of the input/output model of the fuel cell system is as follows:

$$u = \begin{bmatrix} I_{st} \\ W_{cp} \end{bmatrix}$$

$$V_{st} = nV_{cell} = n[\lambda_1 + \lambda_2 \ln(P_{O_2}) + (\lambda_3 \cdot T_{st} + \lambda_4) \cdot i]$$

wherein $i = I_{st}/A_{fc}$ is current density of the fuel cell, $A_{fc}$ is an effective activation area, $V_{cell}$ is a voltage of a single fuel cell, u is input in the input/output model of the fuel cell system, $I_{st}$ the current of the fuel cell, $W_{cp}$ is the assumed outlet flow of the air compressor, $V_{st}$ is the voltage of the fuel cell stack, n is a number of fuel cells, $P_{O_2}$ is the partial pressure of oxygen of the cathode flow channel, $T_{st}$ is the temperature of the fuel cell, $\lambda_1$ is a first parameter to be fitted, $\lambda_2$ is a second parameter to be fitted, $\lambda_3$ is a third parameter to be fitted, and $\lambda_4$ is a fourth parameter to be fitted.

4. The fuel cell control method based on the model prediction control according to claim 2, wherein a calculation expression of a performance index $z_p$ of the fuel cell system is as follows:

$$z_P = \begin{bmatrix} P_{Net} \\ \lambda_{O_2} \end{bmatrix} = \begin{bmatrix} V_{st}I_{st} - \dfrac{C_p T_{atm}}{\eta_{cp}}\left[\left(\dfrac{P_{sm}}{P_{atm}}\right)^{\frac{\gamma-1}{\gamma}} - 1\right]W_{cp} \\ k_{ca,in}\dfrac{x_{O_2}}{1+\omega_{atm}}\dfrac{4F}{nM_{O_2}I_{st}}(P_{sm} - P_{ca}) \end{bmatrix}$$

wherein $P_{Net}$ is net output power of the fuel cell system, $\lambda_{O_2}$ is an oxygen excess ratio of the fuel cell system, $V_{st}$ is the voltage of the fuel cell, $I_{st}$ is the current of the fuel cell, $C_p$ is a specific heat at constant pressure of air, $T_{atm}$ is ambient temperature, $\eta_{cp}$ is efficiency of the air compressor, $P_{sm}$ is the outlet pressure of the air compressor, $P_{atm}$ is ambient pressure, $W_{cp}$ is the outlet flow of the air compressor, $\gamma$ is a heat ratio coefficient of the air, $k_{ca,in}$ is an inlet flow coefficient of the cathode flow channel, $x_{O_2}$ is a mass fraction of oxygen in the air, $\omega_{atm}$ is a mass fraction of water vapor in the air, F is Faraday constant, n is a number of fuel cells, $M_{O_2}$ is a molar mass of oxygen, and $P_{ca}$ is the pressure of the cathode flow channel of the fuel cell.

5. The fuel cell control method based on the model prediction control according to claim 2, wherein an optimal control law of the prediction model is solved by adopting a particle swarm algorithm, and the optimal control law is applied to the fuel cell system.

6. The fuel cell control method based on the model prediction control according to claim 1, wherein a calculation expression of the target angular speed $\omega_{cp}^*(k)$ of the air compressor is as follows:

$$\omega_{cp}^*(k+1) = \frac{2\pi n_{cp}^*(k+1)}{60}$$

wherein $n_{cp}^*(k+1)$ is a target rotational speed of the air compressor and is calculated based on the target outlet flow of the air compressor, the outlet pressure of the air compressor predicted by the prediction model, and a static map of the air compressor.

7. The fuel cell control method based on the model prediction control according to claim 6, wherein a calculation expression of the predicted load moment $\tau_{cp}$ of the air compressor is as follows:

$$\tau_{cp} = \frac{C_p}{\omega_{cp}^*(k+1)}\frac{T_{atm}}{\eta_{cp}}\left[\left(\frac{\hat{P}_{sm}(k+1)}{P_{atm}}\right)^{\frac{\gamma-1}{\gamma}} - 1\right]W_{cp}^*(k)$$

wherein $C_p$ is the specific heat at the constant pressure of the air, $T_{atm}$ is the ambient temperature, $P_{atm}$ is the ambient pressure, $\eta_{cp}$ is the efficiency of the air compressor, $W_{cp}^*(k)$ is a target outlet flow of the air compressor at the time k, and $\hat{P}_{sm}(k+1)$ is outlet pressure of the air compressor at the time k+1 predicted by the prediction model; and a calculation expression of the average angular acceleration $\bar{\alpha}_{cp}$ of the air compressor is as follows:

$$\bar{\alpha}_{cp} = \frac{\hat{\omega}_{cp}^*(k+1) - \omega_{cp}(k)}{T}$$

wherein T is a control period, and $\omega_{cp}(k)$ is a current rotational speed of the air compressor.

8. A fuel cell control system based on model prediction control, comprising a fuel cell control unit, a CAN bus, a data collection module, an air compressor controller, and a DC/DC controller, wherein the fuel cell control unit is separately connected to the data collection module, the air compressor controller, and the DC/DC controller through the CAN bus, and the fuel cell control unit executes a fuel cell control method based on model prediction control, wherein the method comprises:

S1: obtaining data required for control, by a fuel cell control unit, from a vehicle control unit and a data collection module, wherein the data required for control comprise required power for a fuel cell system, a rotational speed of an air compressor, outlet pressure of the air compressor, temperature of a fuel cell, gas pressure of a cathode inlet of the fuel cell, gas pressure of a cathode outlet of the fuel cell, a voltage of the fuel cell, and a current of the fuel cell;

S2: determining whether all the data required for control are obtained by the fuel cell control unit, and under a condition that all the data required for control are obtained, proceeding to step S3, otherwise proceeding to step S1;

S3: by the fuel cell control unit, estimating an internal state of the fuel cell based on the outlet pressure of the air compressor and the voltage of the fuel cell by adopting an unscented Kalman filter algorithm, to obtain a state estimation result, wherein the internal state comprises pressure and partial pressure of oxygen of the cathode of the fuel cell;

wherein in the unscented Kalman filter algorithm, the current of the fuel cell and an outlet flow of the air compressor are taken as an input of a system, the voltage of the fuel cell and intake manifold pressure are taken as an output of the system;

wherein linear continuous state equations of the system are $$\begin{cases} \dfrac{dP_{sm}}{dt} = -\dfrac{k_3 k_{ca,in} RT_{atm}}{M_{a,atm}V_{sm}}P_{sm} + \dfrac{k_3 k_{ca,in} RT_{atm}}{M_{a,atm}V_{sm}}P_{ca} + \dfrac{k_3 RT_{atm}}{M_{a,atm}V_{sm}}W_{cp} \\ \dfrac{dP_{ca}}{dt} = \dfrac{k_{ca,in}RT_{st}}{V_{ca}}\left[\dfrac{1}{M_{O_2}}\left(\dfrac{x_{O_2}}{1+\omega_{atm}}\right) + \dfrac{1}{M_{N_2}}\left(\dfrac{1-x_{O_2}}{1+\omega_{atm}}\right)\right]P_{sm} \\ \quad - \dfrac{RT_{st}}{V_{ca}}\left\{k_{ca,in}\left[\dfrac{1}{M_{O_2}}\left(\dfrac{x_{O_2}}{1+\omega_{atm}}\right) + \dfrac{1}{M_{N_2}}\left(\dfrac{1-x_{O_2}}{1+\omega_{atm}}\right)\right] + \dfrac{k_2}{k_1}\right\}P_{ca} \\ \quad - \dfrac{nRT_{st}}{4V_{ca}F}I_{st} + \dfrac{k_2 RT_{st}}{k_1 V_{ca}}P_{sat} \\ \dfrac{dP_{O_2}}{dt} = \dfrac{k_{ca,in}RT_{st}}{M_{O_2}V_{ca}}\left(\dfrac{x_{O_2}}{1+\omega_{atm}}\right)P_{sm} - \dfrac{k_{ca,in}RT_{st}}{M_{O_2}V_{ca}}\left(\dfrac{x_{O_2}}{1+\omega_{atm}}\right) \\ P_{ca} - \dfrac{k_2 RT_{st}}{k_1 V_{ca}}P_{O_2} - \dfrac{nRT_{st}}{4V_{ca}F}I_{st} \end{cases}$$

wherein $k_{ca,in}$ is an inlet flow coefficient of a cathode flow channel, R is a gas constant, $T_{atm}$ is ambient temperature, $P_{sm}$ is outlet pressure of the air compressor, $M_{a,atm}$ is a molar mass of air, $V_{sm}$ is a volume of an air supply pipe, $P_{ca}$ is pressure of the cathode flow channel of the fuel cell, $W_{cp}$ is an assumed outlet flow of the air compressor, $T_{st}$ is the temperature of the fuel cell, $V_{ca}$ is a volume of the cathode flow channel of the fuel cell, $M_{O_2}$ is a molar mass of oxygen, $x_{O_2}$ is a mass fraction of oxygen in the air, $\omega_{atm}$ is a mass of water vapor in the air, $M_{N_2}$ is a molar mass of nitrogen, F is a Faraday constant, $P_{sat}$ saturated vapor pressure, $P_{O_2}$ is partial pressure of oxygen of the cathode flow channel, $I_{st}$ is the current of the fuel cell, and $k_1$, $k_2$, and $k_3$ are constants;

S4: by the fuel cell control unit, calculating a target outlet flow of the air compressor and a target current of the fuel cell with a model prediction control algorithm based on the state estimation result;

wherein the model prediction control algorithm performs calculation based on a pre-established prediction model, wherein the prediction model comprises a three-order linear state space model of an air supply system for the fuel cell;

wherein an expression of the three-order linear state space model of the air supply system for the fuel cell is as follows:

$$\begin{bmatrix} \dot{P}_{sm} \\ \dot{P}_{ca} \\ \dot{P}_{O_2} \end{bmatrix} = A_{3\times 3} \begin{bmatrix} P_{sm} \\ P_{ca} \\ P_{O_2} \end{bmatrix} + B_{3\times 2} \begin{bmatrix} I_{st} \\ W_{cp} \end{bmatrix}$$

wherein $P_{sm}$ is the outlet pressure of the air compressor, $P_{ca}$ is pressure of a cathode flow channel of the fuel cell, $P_{O_2}$ is partial pressure of oxygen of the cathode flow channel, $\dot{P}_{sm}$ is a first-order differential of the outlet pressure of the air compressor, $\dot{P}_{ca}$ is a first-order differential of the pressure of the cathode flow channel of the fuel cell, $\dot{P}_{O_2}$ is a first-order differential of the partial pressure of oxygen of the cathode flow channel, $I_{st}$ is the current of the fuel cell, $W_{cp}$ is an outlet flow of the air compressor, $A_{3\times 3}$ is a first coefficient matrix, and $B_{3\times 2}$ is a second coefficient matrix;

S5: by the fuel cell control unit, calculating a control voltage of the air compressor based on the rotational speed of the air compressor, the outlet pressure of the air compressor, and the target outlet flow of the air compressor;

wherein a calculation expression of the control voltage of the air compressor is:

$$v_{cm}(k) = \frac{R_{cm}}{\eta_{cm}k_t}(\tau_{cp} + J\bar{\alpha}_{cp}) + k_v \omega_{cp}^*(k)$$

wherein $V_{cm}(k)$ is a control voltage of the air compressor at time k, $R_{cm}$ is armature resistance of a drive motor of the air compressor, $\eta_{cm}$ is a mechanical efficiency of the drive motor of the air compressor, $k_t$ is a first motor constant, $k_v$ is a second motor constant, J is rotational inertia of the is air compressor, $\tau_{cp}$ a predicted load moment of the air compressor, $\bar{\alpha}_{cp}$ is average angular acceleration of the air compressor, and $\omega_{cp}^*(k)$ is target angular speed of the air compressor; and S6: by the fuel cell control unit, controlling the fuel cell to output the target current of the fuel cell, and controlling air supply of the fuel cell based on the control voltage of the air compressor.

9. The fuel cell control system based on the model prediction control according to claim 8, wherein the prediction model further comprises an input/output model of the fuel cell system and a performance index of the fuel cell system.

10. The fuel cell control system based on the model prediction control according to claim 9, wherein the input/output model of the fuel cell system takes the current of the fuel cell and an assumed outlet flow of the air compressor as an input, and a voltage of the fuel cell stack as an output, and an expression of the input/output model of the fuel cell system is as follows:

$$u = \begin{bmatrix} I_{st} \\ W_{cp} \end{bmatrix}$$

$$V_{st} = nV_{cell} = n[\lambda_1 + \lambda_2 \ln(P_{O_2}) + (\lambda_3 \cdot T_{st} + \lambda_4) \cdot i]$$

wherein $i = I_{st}/A_{fc}$ is current density of the fuel cell, $A_{fc}$ is an effective activation area, $V_{cell}$ is a voltage of a single fuel cell, u is input in the input/output model of the fuel cell system, $I_{st}$ the current of the fuel cell, $W_{cp}$ is the assumed outlet flow of the air compressor, $V_{st}$ is the voltage of the fuel cell stack, n is a number of fuel cells, $P_{O_2}$ is the partial pressure of oxygen of the cathode flow channel, $T_{st}$ is the temperature of the fuel cell, $\lambda_1$ is a first parameter to be fitted, $\lambda_2$ is a second parameter to be fitted, $\lambda_3$ is a third parameter to be fitted, and $\lambda_4$ is a fourth parameter to be fitted.

11. The fuel cell control system based on the model prediction control according to claim 9, wherein a calculation expression of a performance index $z_p$ of the fuel cell system is as follows:

$$z_P = \begin{bmatrix} P_{Net} \\ \lambda_{O_2} \end{bmatrix} = \begin{bmatrix} V_{st}I_{st} - \frac{C_p T_{atm}}{\eta_{cp}}\left[\left(\frac{P_{sm}}{P_{atm}}\right)^{\frac{\gamma-1}{\gamma}} - 1\right]W_{cp} \\ k_{ca,in}\frac{x_{O_2}}{1+\omega_{atm}}\frac{4F}{nM_{O_2}I_{st}}(P_{sm} - P_{ca}) \end{bmatrix}$$

wherein $P_{Net}$ is net output power of the fuel cell system, $\lambda_{O_2}$ is an oxygen excess ratio of the fuel cell system, $V_{st}$ is the voltage of the fuel cell, $I_{st}$ is the current of the fuel cell, $C_p$ is a specific heat at constant pressure of air, $T_{atm}$ is ambient temperature, $\eta_{cp}$ is efficiency of the air compressor, $P_{sm}$ is the outlet pressure of the air compressor, $P_{atm}$ is ambient pressure, $W_{cp}$ is the outlet flow of the air compressor, $\gamma$ is a heat ratio coefficient of the air, $k_{ca,in}$ is an inlet flow coefficient of the cathode flow channel, $x_{O_2}$ is a mass fraction of oxygen in the air, $\omega_{atm}$ is a mass fraction of water vapor in the air, F is Faraday constant, n is a number of fuel cells, $M_{O_2}$ is a molar mass of oxygen, and $P_{ca}$ is the pressure of the cathode flow channel of the fuel cell.

12. The fuel cell control system based on the model prediction control according to claim 9, wherein an optimal control law of the prediction model is solved by adopting a particle swarm algorithm, and the optimal control law is applied to the fuel cell system.

13. The fuel cell control system based on the model prediction control according to claim 8, wherein a calculation expression of the target angular speed $\omega_{cp}^*(k)$ of the air compressor is as follows:

$$\omega_{cp}^*(k+1) = \frac{2\pi n_{cp}^*(k+1)}{60}$$

wherein $n_{cp}^*(k+1)$ is a target rotational speed of the air compressor and is calculated based on the target outlet flow of the air compressor, the outlet pressure of the air compressor predicted by the prediction model, and a static map of the air compressor.

14. The fuel cell control system based on the model prediction control according to claim 13, wherein a calculation expression of the predicted load moment $\tau_{cp}$ of the air compressor is as follows:

$$\tau_{cp} = \frac{C_p}{\omega_{cp}^*(k+1)} \frac{T_{atm}}{\eta_{cp}} \left[ \left( \frac{\hat{P}_{sm}(k+1)}{P_{atm}} \right)^{\frac{\gamma-1}{\gamma}} - 1 \right] W_{cp}^*(k)$$

wherein $C_p$ is the specific heat at the constant pressure of the air, $T_{atm}$ is the ambient temperature, $P_{atm}$ is the ambient pressure, $\eta_{cp}$ is the efficiency of the air compressor, $W_{cp}^*(k)$ is a target outlet flow of the air compressor at the time k, and $\hat{P}_{sm}(k+1)$ is outlet pressure of the air compressor at the time k+1 predicted by the prediction model; and a calculation expression of the average angular acceleration $\bar{\alpha}_{cp}$ of the air compressor is as follows:

$$\bar{\alpha}_{cp} = \frac{\hat{\omega}_{cp}^*(k+1) - \omega_{cp}(k)}{T}$$

wherein T is a control period, and $\omega_{cp}(k)$ is a current rotational speed of the air compressor.

* * * * *